United States Patent
Buradagunta et al.

(10) Patent No.: US 12,067,544 B2
(45) Date of Patent: Aug. 20, 2024

(54) METHOD AND SYSTEM FOR SUPPORTING MICRO-TRANSACTIONS IN A DIGITAL ASSET NETWORK VIA DIGITAL TOKENS

(71) Applicant: MASTERCARD INTERNATIONAL INCORPORATED, Purchase, NY (US)

(72) Inventors: Sarala Buradagunta, West Orange, NJ (US); Rakesh Yadav, Cape Elizabeth, ME (US); Sébastien Le Callonnec, Greystones (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 621 days.

(21) Appl. No.: 17/206,949

(22) Filed: Mar. 19, 2021

(65) Prior Publication Data

US 2021/0295290 A1    Sep. 23, 2021

Related U.S. Application Data

(60) Provisional application No. 62/992,869, filed on Mar. 20, 2020.

(51) Int. Cl.
*G06Q 20/12* (2012.01)
*G06Q 20/02* (2012.01)
(Continued)

(52) U.S. Cl.
CPC ......... *G06Q 20/123* (2013.01); *G06Q 20/027* (2013.01); *G06Q 20/0655* (2013.01);
(Continued)

(58) Field of Classification Search
CPC ............... G06Q 20/123; G06Q 20/027; G06Q 20/0655; G06Q 20/29; G06Q 20/40;
(Continued)

(56) References Cited

U.S. PATENT DOCUMENTS 10,496,984 B1    12/2019 Zarakas et al.
2007/0276759 A1*  11/2007 Ginter ............... H04L 12/40104
                                                        705/53

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Jul. 1, 2021, by the International Application Division Korean Intellectual Property Office in corresponding International Application No. PCT/US2021/023193. (9 pages).

*Primary Examiner* — Courtney P Jones
*Assistant Examiner* — Christine Dang
(74) *Attorney, Agent, or Firm* — Panitch Schwarze; Belisario & Nadel LLP

(57) ABSTRACT

The disclosed method includes: receiving, by a receiving device of a processing server, a transaction request for a financial transaction, the transaction request including at least information associated with a consumer; forwarding at least the information associated with the consumer, the information associated with the merchant, and the transaction amount or projected transaction amount to an issuer; receiving an authorization from the issuer for the transaction amount or projected transaction amount; forwarding the authorization to the merchant; receiving a triggering event for the financial transaction between the consumer and the merchant; sending a request to the issuer for digital tokens to be held for payment of the transaction between the consumer and the merchant; receiving a plurality of digital tokens from the issuer for the payment of the transaction between the consumer and the merchant; and holding the plurality of digital tokens received from the issuer for the financial transaction.

16 Claims, 10 Drawing Sheets

(51) Int. Cl.
  *G06Q 20/06* (2012.01)
  *G06Q 20/22* (2012.01)
  *G06Q 20/40* (2012.01)
  *H04L 9/06* (2006.01)
  *H04L 9/00* (2022.01)

(52) U.S. Cl.
  CPC ............ *G06Q 20/29* (2013.01); *G06Q 20/40* (2013.01); *H04L 9/0618* (2013.01); *H04L 9/0643* (2013.01); *H04L 9/50* (2022.05)

(58) Field of Classification Search
  CPC .... G06Q 20/0457; G06Q 20/12; G06Q 20/14; G06Q 20/38215; G06Q 20/3827; H04L 9/0618; H04L 9/0643; H04L 9/50; H04L 2209/56; H04L 9/3239
  See application file for complete search history.

(56) References Cited

U.S. PATENT DOCUMENTS

| | | |
|---|---|---|
| 2010/0114733 A1* | 5/2010 | Collas ............... G06Q 30/0613 705/26.1 |
| 2015/0106239 A1 | 4/2015 | Gaddam et al. |
| 2016/0078428 A1* | 3/2016 | Moser ............... G06Q 20/4012 705/41 |
| 2016/0217459 A1* | 7/2016 | Lindner .............. G06Q 20/367 |
| 2019/0147515 A1 | 5/2019 | Hurley et al. |
| 2019/0188696 A1 | 6/2019 | Carpenter et al. |
| 2019/0340685 A1 | 11/2019 | Wade et al. |
| 2019/0378140 A1* | 12/2019 | Sarkissian ............. G06Q 20/02 |
| 2020/0013048 A1* | 1/2020 | Love .................... H04L 9/0637 |
| 2020/0143337 A1* | 5/2020 | Conroy .................. G06Q 40/12 |
| 2021/0035098 A1* | 2/2021 | Long .................... H04L 9/0643 |

* cited by examiner

METHOD AND SYSTEM FOR SUPPORTING MICRO-TRANSACTIONS IN A DIGITAL ASSET NETWORK VIA DIGITAL TOKENS

TECHNICAL FIELD

The present disclosure relates to a method and system for supporting micro-transactions in a digital asset network via digital tokens.

BACKGROUND

In traditional financial transactions, consumers often used cash or personal checks in order to pay merchants for goods or services. Over time, credit cards and other types of payment cards gained mainstream use. However, using a payment card may require the consumer, merchant, or both to pay a processing fee to a payment processor for processing payment across traditional payment network process paths, i.e., payment rails. Because of the existence of processing fees, some merchants set a minimum transaction amount that is required when a payment card is used. Merchants might accumulate small charges over a period of time, but it is not uncommon for the accumulated amount to still be small and the transaction fees erode the value of the transaction for the party paying the fees.

At the same time, consumers are entering more and more financial transactions with merchants for smaller and smaller amounts. These micropayment transactions will at times be for a payment amount that is small and even less than the costs of processing the transaction, such as transactions for things like digital music and other content that might be worth less than a dollar or even pennies. This can result in a higher expense to the consumer, higher costs for the merchant, loss of revenue to payment processors, or others depending on the circumstances. Though this might be viewed as a business problem, it presents a technical challenge to process payments to avoid this aspect of the normal payment network.

Currently, there is a need for a technical solution whereby micro-transactions can be implemented by bringing in the power of a digital asset, for example, digital tokens, smart contracts, and grafting, with exiting payment rails.

SUMMARY

The present disclosure provides a description of methods and systems for supporting micro-transactions in a digital asset network via digital tokens, and which includes a delayed clearing and settlement.

A method is disclosed of supporting micro-transactions in a digital asset network, the method comprising: receiving, by a receiving device of a processing server, a transaction request for a financial transaction, the transaction request including at least information associated with a consumer, information associated with a merchant, and a transaction amount or projected transaction amount; forwarding, by a transmitting device of the processing server, the at least information associated with the consumer, the information associated with the merchant, and the transaction amount or projected transaction amount to an issuer; receiving, by the receiving device of the processing server, an authorization from the issuer for the transaction amount or projected transaction amount; forwarding, by the transmitting device of the processing server, the authorization to the merchant; receiving, by the receiving device of the processing server, a triggering event for the financial transaction between the consumer and the merchant; sending, by the transmitting device of the processing server, a request for digital tokens to be held in by the processing server for payment of the transaction between the consumer and the merchant; receiving, by the receiving device of the processing server, a plurality of digital tokens from the issuer for the payment of the transaction between the consumer and the merchant; and holding, by the processing server, the plurality of digital tokens received from the issuer for the financial transaction.

A system is disclosed for supporting micro-transactions in a digital asset network, the system comprising: a processing server configured to: receive a transaction request for a financial transaction, the transaction request including at least information associated with a consumer, information associated with a merchant, and a transaction amount or projected transaction amount; forward the at least information associated with the consumer, the information associated with the merchant, and the transaction amount or projected transaction amount to an issuer; receive an authorization from the issuer for the transaction amount or projected transaction amount; forward the authorization to the merchant; receive a triggering event for the financial transaction between the consumer and the merchant; send a request to the issuer for digital tokens to be held by the processing server for payment of the transaction between the consumer and the merchant; receive a plurality of digital tokens from the issuer for the payment of the transaction between the consumer and the merchant; and hold the plurality of digital tokens received from the issuer for the financial transaction.

BRIEF DESCRIPTION OF THE DRAWING FIGURES

Exemplary embodiments are best understood from the following detailed description when read in conjunction with the accompanying drawings. It is emphasized that, these are exemplary embodiments, to which the claimed invention is not limited. Included in the drawings are the following figures:

Figure 1:
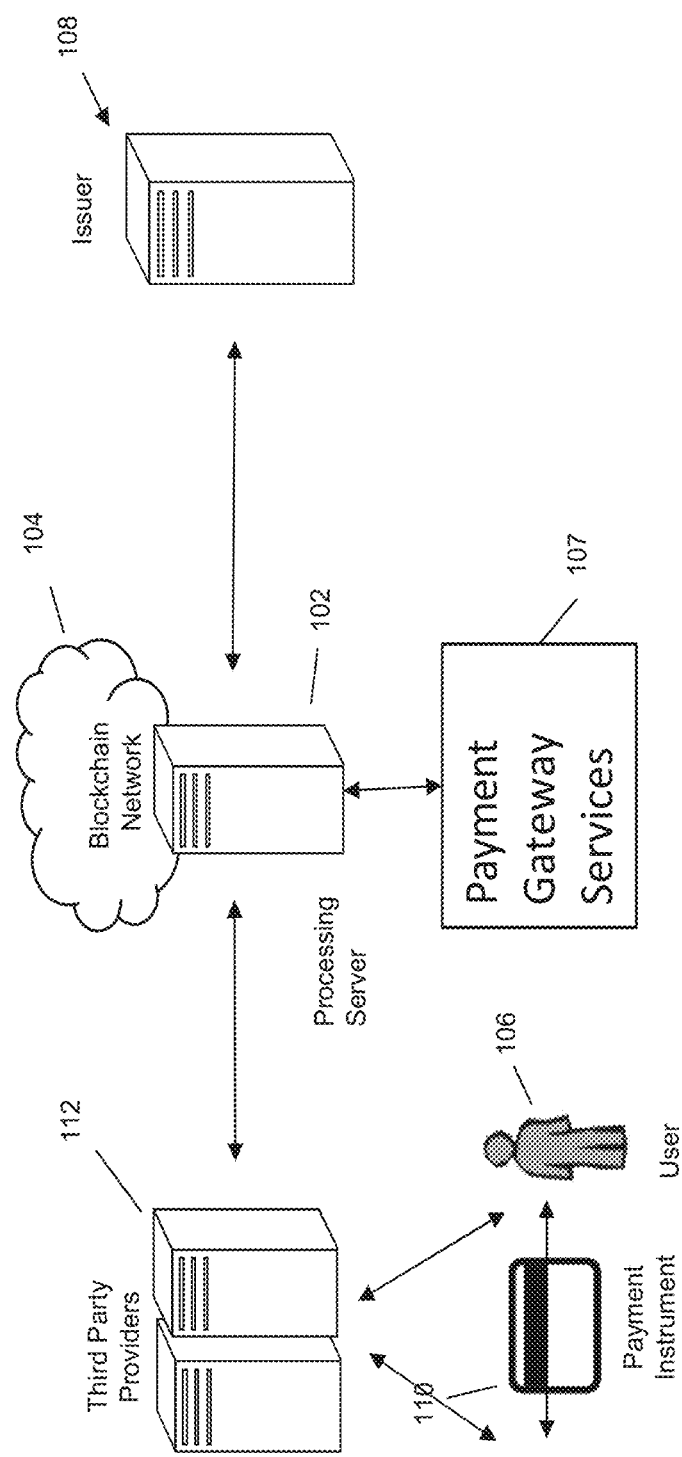
FIG. 1 is a block diagram illustrating a high-level system architecture for supporting micro-transactions in a digital asset network via digital tokens.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Blockchain—A public ledger of all transactions of a blockchain-based currency or network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Third Party Provider or Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Supporting Micro-Transactions in a Digital Asset Network

FIG. 1 illustrates a system 100 for supporting micro-transactions in a digital asset network.

In the system 100, for example, a user 106 may engage in a financial transaction or purchase of a service or product from a third-party provider 112 (e.g., merchants, social media, subscription services, and nearly any other entity, particularly entities that might want to charge small amounts, i.e., micropayments) with, for example, a payment instrument 110. The transaction may occur at a physical location of the third-party provider 112, or may be performed remotely, such as through the Internet, over telephone, by mail order, or by any other method suitable for financial transactions.

In an embodiment, the system 100 may include one or more issuers 108, which may be a financial institution, such as an issuing bank, or other suitable entity that is configured to issue a transaction account to the user 106 for use in funding payment transactions. The issuer or issuing institution 108 may issue a transaction account to the user 106 and, as part of the issuing of the transaction account, may optionally issue a payment instrument 110 to the user 106. The payment instrument 110 may be, for instance, a credit card, virtual payment card, mobile application or wallet, check, etc. The payment instrument 110 may be encoded with, include, or be otherwise associated with payment credentials corresponding to a transaction account. The payment credentials may include any data that must be communicated as part of a transaction process for the transaction to be funded via the related transaction account, such as a primary account number, expiration date, and security code.

The system 100 may include a processing server 102. The processing server 102 may be one of a plurality of nodes or processors comprising a blockchain network 104. Further, it can be composed of an internal or external network of nodes (servers on a network) that collectively form a digital commerce platform (DCP) mainnet 105 such as shown in FIGS. 5-10 in addition to other services and functions, and connected to ancillary services such as payment gateway services 107, which provide advanced technology to enables customers to securely accept and process transactions across e-commerce, m-commerce and cardholder present channels that connect to hundreds of acquirers globally. The blockchain network 104 may be associated with one or more blockchains, which may be used to store data associated with the issuer 108 (e.g., a bank) and the plurality of third-party providers 112. The processing server 102 may be configured to generate and validate new blocks that are added to the blockchain, where the validation process for a new block may involve mathematical verification of data stored therein across a plurality of the nodes comprising the blockchain network 104. The processing server 102, discussed in more detail below with respect to FIG. 2, may be configured to support micro-transaction in a digital asset network via digital tokens.

In accordance with an embodiment, due to the expenses incurred with processing financial transactions across traditional payment rails (e.g., Automated Clearing House (ACH), wire transfers, etc.), payment processors (e.g., a payment processor) may charge fees, such as to the third-party provider or merchant 112 or the merchant's acquiring bank (e.g., the acquirer), for each transaction processed. In some instances, the fee for processing a financial transaction may rival or even be greater than the value of the product. For micropayment transactions, financial transactions of amounts that are small (e.g., fractions of a standard unit of currency, such as transactions less than a U.S. dollar, for example, three cents to five cents, or even fractions of a cent), the added expense of processing fees may cause the third-party provider or merchant 112 to lose a significant amount of revenue when payment cards are used to pay for micropayment transactions.

In accordance with an exemplary embodiment, methods and systems are disclosed for supporting micro-transactions in a digital asset network via digital tokens, which are issued by the issuer 108 and held, for example, in escrow, by the processing server 102, and upon the user 106 engaging in a micro-transaction with the third-party provider or merchant 112, one or more digital tokens can be sent to the third-party provider or merchant 112 for the services or products provided in the micro-transaction. The third-party providers 112 may assemble a group or aggregate of digital tokens for payment in accordance with the methods and systems as disclosed herein, for example, as shown in FIGS. 3-9.

In accordance with an exemplary embodiment, the blockchain network 104 associated with the processing server 102 may be configured to store token profiles associated with digitized payment tokens. Each token profile may include a digitized payment token or information in identification thereof (e.g., a digital token number), the associated transaction account number, and data associated with the payment instrument 110 to which the respective digitized payment token was distributed. In some instances, the processing server 102 may be a token distribution platform or may be part of a computing system configured to operate as a token distribution platform, and may identify the data for token profiles as a result of functions performed in connection therewith.

In accordance with an exemplary embodiment, the user (or consumer) 106 may initiate a financial transaction with the third-party provider 112, such as through a web server. The financial transaction may be a micropayment transaction. In an exemplary embodiment, the micropayment transaction is for an amount issued in a digital token. When the user (or consumer) 106 initiates the financial transaction with the third-party provider 112, the web server may communicate with the processing server 102 to carry out the transaction. In one embodiment, the transaction data may be transmitted pursuant to the International Organization for Standardization's ISO 8583 standard.

Processing Server

Figure 2:
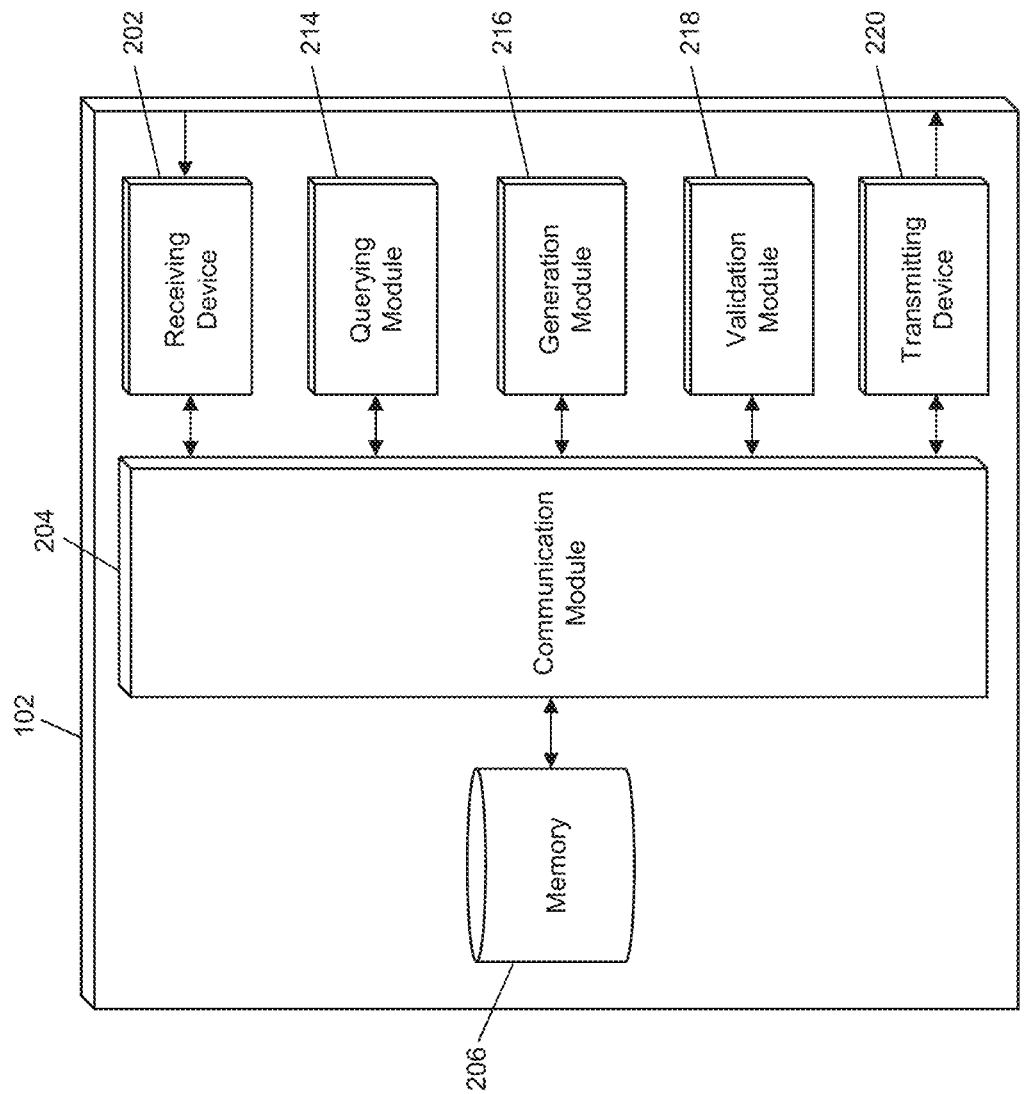
FIG. 2 is a block diagram illustrating a processing server of the system of FIG. 1 for supporting micro-transaction in a digital asset network via digital tokens in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1000 illustrated in FIG. 10 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuer 108 and third-party provider 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuer 108, which may be accompanied by authentication information to authenticate the issuer 108 (i.e., issuing institution) as the source of the data, which may, in some instances, include a digital signature generated via a private key associated with the issuer 108 (or issuing institution). The receiving device 202 may also be configured to receive data signals electronically transmitted by third-party providers systems 112, as applicable.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein. In some embodiments, the processing device may include and/or be comprised of a plurality of engines and/or modules specially configured to perform one or more functions of the processing device, such as a querying module 214, generation module 216, validation module 218, etc. As used herein, the term "module" may be software executed on hardware or hardware otherwise configured to receive an input, perform one or more processes using the input, and provides an output. It is manifested as a portion of a hardware processor specifically configured to carry out these functions upon execution of the software on the hardware. The input, output, and processes performed by various modules will be apparent to one skilled in the art based upon the present disclosure.

The processing server 102 may include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory may also be configured to store any additional data that may be used by the processing server 102 in performing the functions discussed herein, such as hashing algorithms for generating reference values for the blockchain, communication data for communicating with other blockchain nodes and other computing devices, access data for providing access to third-party providers or merchant systems 112 to blockchain data, public keys corresponding to private keys provisioned to issuer 108 for verification of digital signatures, etc.

The processing server 102 may include a querying module 214. The querying module 214 may be configured to execute queries on databases to identify information. The querying module 214 may receive one or more data values or query strings and may execute a query string based thereon on an indicated database, such as the memory 206, to identify information stored therein. The querying module 214 may then output the identified information to an appropriate engine or module of the processing server 102 as necessary. The querying module 214 may, for example, execute a query on the memory 206 to identify a the most recent block added to the blockchain (e.g., based on timestamp) as part of the process in generating a new block, or may execute a query on the memory 206 to identify a public key corresponding to the issuer 108 for use in validating a digital signature provided with data associated with the type of services or functions provided by the issuer 108 for authentication thereof.

The processing server 102 may also include a generation module 216. The generation module 216 may be configured to generate data for the processing server 102 for use in performing the functions discussed herein. The generation module 216 may receive instructions as input, may generate data based on the instructions, and may output the generated data to one or more modules or engines of the processing server 102. For example, the generation module 216 may be configured to generate new blocks and new block headers for confirmation and addition into the blockchain. The generation module 216 may also be configured to generate hash values via the application of hashing algorithms to data, such as for the generation of reference values to be included in the block header of a newly generated block. In some cases, the generation of hash values may be performed via a separate hashing module included in the processing server 102.

The processing server 102 may also include a validation module 218. The validation module 218 may be configured to validate data for the processing server 102 and the issuer 108 for use in performing the functions discussed herein. The validation module 218 may receive instructions as input, may validate data as instructed, and may output a result of the validation to another module or engine of the processing server 102.

The processing server 102 may also include a transmitting device 220. The transmitting device 220 may be configured to transmit data over one or more networks via one or more network protocols. In some instances, the transmitting device 220 may be configured to transmit data to the issuer 108 in the blockchain network 104, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

Micro-Transaction Processing Flow

Figure 3:
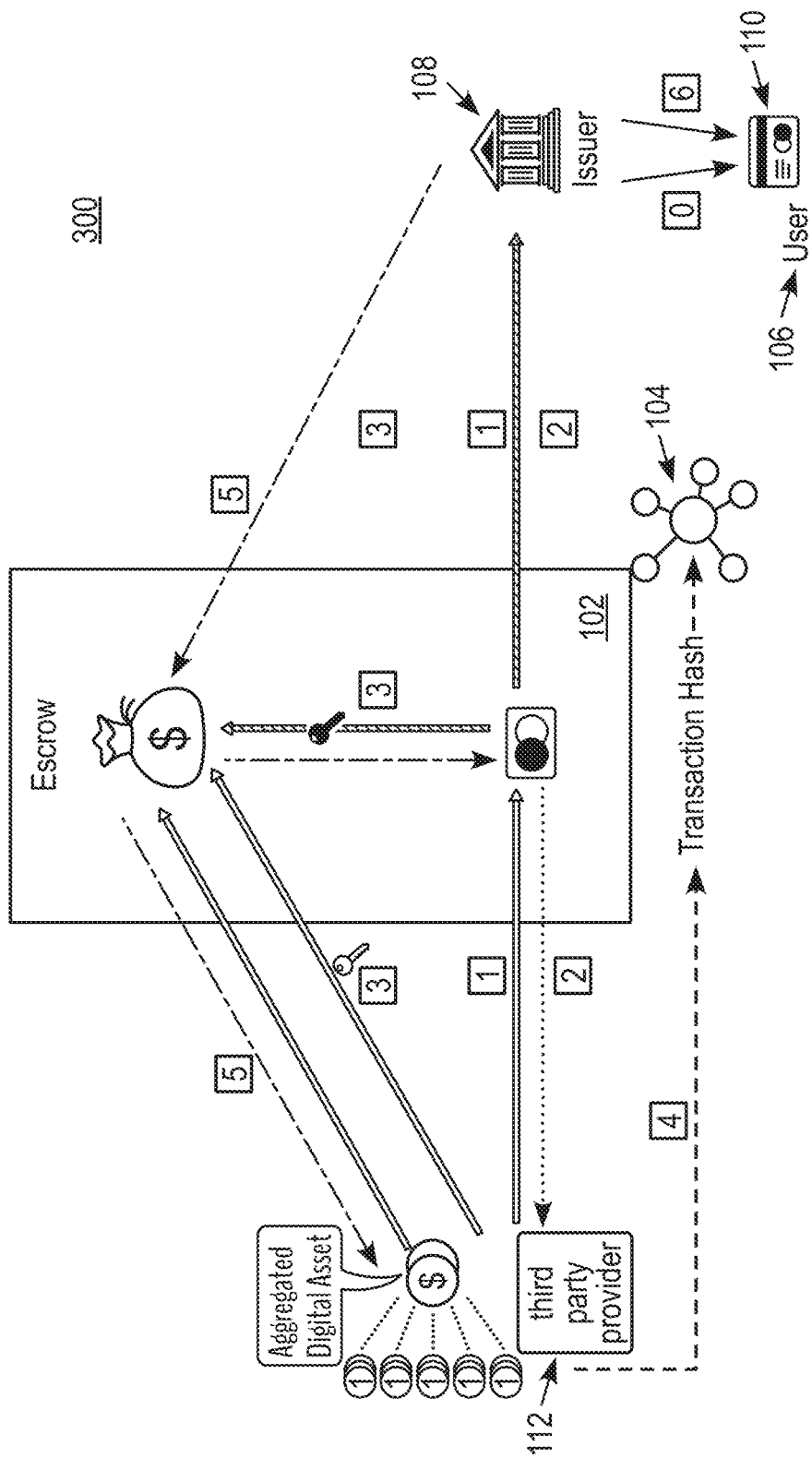
FIG. 3 is a flow diagram illustrating a process for supporting micro-transactions in a digital asset network via digital tokens in the system of FIG. 1 in accordance with an embodiment.

FIG. 3 is a flow diagram 300 illustrating a process for supporting micro-transactions in a digital asset network via digital tokens in the system of FIG. 1 in accordance with an embodiment. As shown in FIG. 3, a user (e.g., the consumer 106) having been issued a payment instrument (step 0) may shop with the third-party provider 112 (e.g., on a website of the third-party provider 112 or at a physical location of the third-party provider 112) and choose to begin receiving services, which may be payable in amount of a micro-transaction, for example, streaming of videos, listening or purchasing music, and/or video gaming. In accordance with an exemplary embodiment, one or more each of the steps as set forth herein may be recorded in the blockchain network 104.

In step 1, the third-party provider 112 may send transaction details to the payment processing server 102, which may receive (e.g., and store, such as in the database or blockchain network 104, the transaction details). The transaction details may include merchant identifying information, consumer identifying information, a transaction amount or projected transaction amount, and/or type of transaction. In one embodiment, the transaction data may be transmitted pursuant to the International Organization for Standardization's ISO 8583 standard. In step 1, the transaction details can then be forwarded to the issuer 108 for verification of funds, i.e., digital tokens, and with a request for funding, for example, with a request for a set number of digital tokens.

In step 2, the payment processing server 102 receives the verification of funds from the issuer 108 and may transmit the account information to the third-party provider 112 in step 2 indicating that funds (i.e., digital tokens) are available for payment of the transaction requested by the user 106.

In accordance with an embodiment, in step 3, the user 106 begins using services provided by the third-party provider 112 and the transaction details, such as the merchant name, transaction amount payable in digital tokens is sent to the processing server 102. In step 3, the issuer 108 in response to the previous request for verification from the processing server 102 (step 2), sends a plurality of digital tokens to the processing server 102, which are held in escrow by the processing server 102.

In step 4, the transactions are recorded on the blockchain 104. The processing server 102 will forward one or more digital tokens to the third-party provider 112 for payment of the transaction amount accrued over, for example, a set period of time or per individual transaction. For example, streaming of videos may require payment of a digital token after a certain period of time as an aggregated digital asset or data has been streamed. Alternatively, if a purchase is made, the digital token may be sent at that time to the merchant or third-party provider 112. In accordance with an exemplary embodiment, each of the transactions is preferably a micro-transaction in which the payment amount is relatively small and less than the costs of processing the transaction, such as transactions for things like digital music and other content that might be worth less than a dollar or even pennies.

In step 5, the processing server 102 forwards the one or more digital tokens to the third-party provider 112 and sends a corresponding transmission to the issuer 108 confirming the transaction amount. In an embodiment, the processing server 102 continues to send digital tokens to the third-party provider 112 upon request until the number of digital tokens being held by the processing server 102 is depleted. In accordance with an embodiment, upon receipt of the corresponding transmission in step 5 and upon depletion of the of the digital tokens held by the processing server, the issuer 108 may issue additional digital tokens to the processing server 102 to be further held in escrow for future transaction amounts by the user 106. Once a transaction between the user 106 and the third-party provider 112 has been completed, any unused digital tokens held by the processing server can be returned to the issuer 108. In accordance with an exemplary embodiment, the exchange of a group of digital tokens or aggregate of digital tokens can be over the payments rails as non-financial communications. In step 6, the issuer 108 settles with the user 106 in accordance with terms and conditions with respect to the payment instrument 110.

Figure 4:
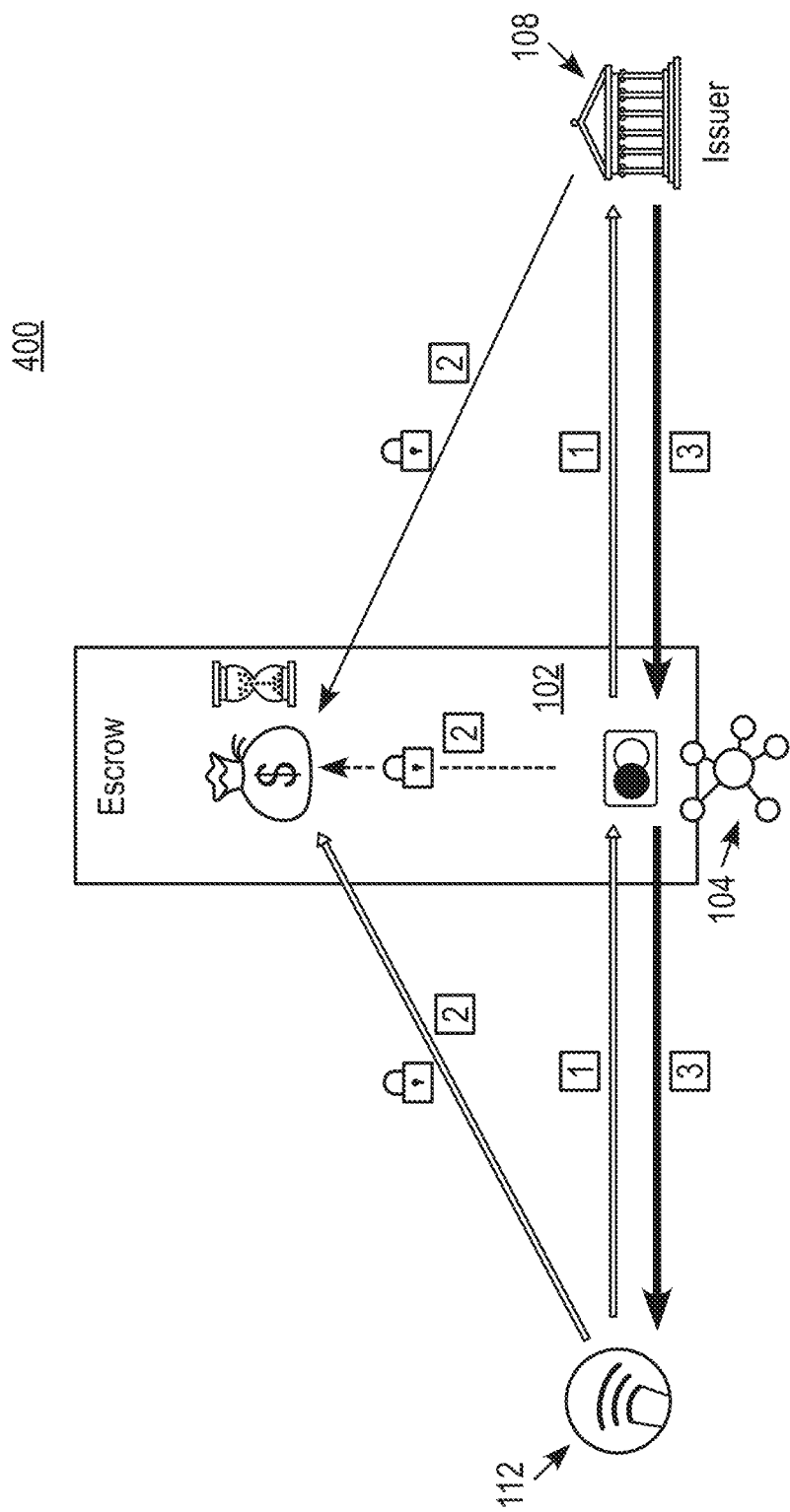
FIG. 4 is a flow diagram illustrating another process for supporting micro-transaction in a digital asset network via digital tokens in the system of FIG. 1 with a time lock in accordance with another embodiment.

FIG. 4 is a flow diagram 400 illustrating another process for supporting micro-transaction in a digital asset network via digital tokens in the system of FIG. 1 with a time lock in accordance with exemplary embodiments. As shown in FIG. 4, a user (e.g., the consumer 106) having been issued a payment instrument (step 0 in FIG. 3) may shop with the third-party provider 112 (e.g., on a website of the third party provider 112 or at a physical location of the third-party provider 112) and choose to begin receiving services, which may be payable in amount of a micro-transaction, for example, streaming of videos, listening or purchasing music, and/or video gaming. In accordance with an exemplary embodiment, one or more or each of the steps as set forth herein may be recorded in the blockchain network 104.

In step 1, the third-party provider 112 may send transaction details to the payment processing server 102, which may receive (e.g., and store, such as in the database or blockchain network 104, the transaction details). The transaction details may include merchant identifying information, consumer identifying information, a transaction amount or projected transaction amount, and/or type of transaction. In one embodiment, the transaction data may be transmitted pursuant to the International Organization for Standardization's ISO 8583 standard. In step 1, the transaction details can then be forwarded to the issuer 108 for verification of funds, i.e., digital tokens, and with a request for funding, for example, with a request for a set number of digital tokens.

In step 2, the payment processing server 102 receives the verification of funds from the issuer 108 and may transmit the account information to the third-party provider 112 indicating that funds (i.e., digital tokens) are available for payment of the transaction requested by the user 106 (not shown in FIG. 4).

In accordance with an embodiment, in step 3, the user 106 begins using services provided by the third-party provider 112 and the transaction details, such as the merchant name, transaction amount payable in digital tokens is sent to the processing server 102. In step 3, the issuer 108 in response to the previous request for verification from the processing server 102 (step 2), sends a plurality of digital tokens to the processing server 102, which are held in escrow by the processing server 102 for the third-party provider 112 with a time lock. Unlike the embodiment shown in FIG. 3, in FIG. 4, the processing server 102 holds the digital tokens in escrow for the third-party provider 112, with a time lock or until settlement, rather than forwarding the digital tokens to the third-party provider 112 as the digital tokens are accrued.

Once a transaction between the user 106 and the third-party provider 112 has been completed, any unused digital tokens held by the processing server can be returned to the issuer 108. In accordance with an exemplary embodiment, the exchange of a group of digital tokens or aggregate of digital tokens can be over the payments rails and the issuer 108 settles with the user 106 via in accordance with terms and conditions as set forth in the payment instrument 110 (not shown in FIG. 4).

Figure 5:
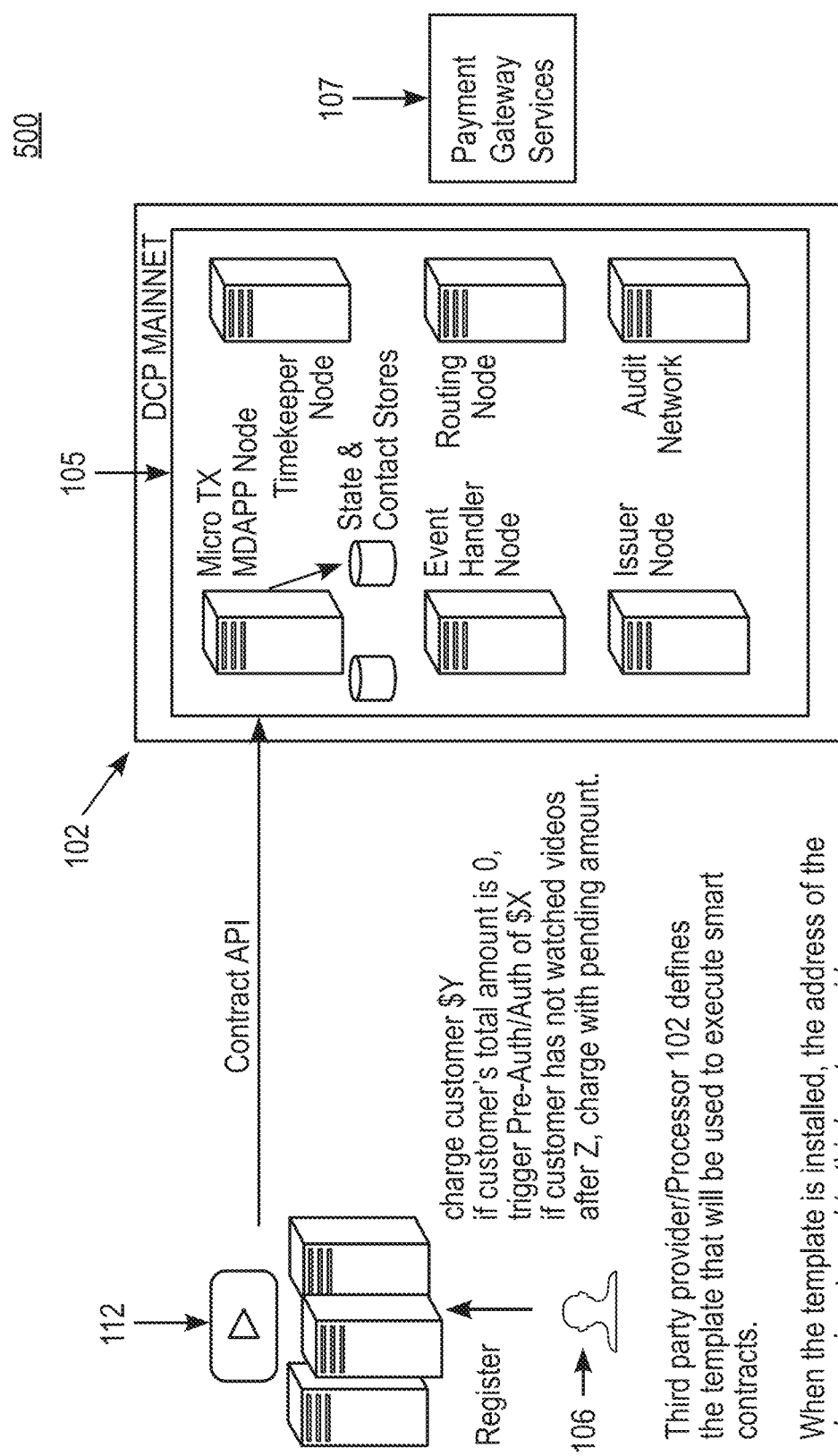
FIG. 5 is an illustration of a system for supporting micro-transactions in a digital asset network according to a further embodiment.

FIG. 5 is an illustration of a system 500 for supporting micro-transactions in a digital asset network according to a further embodiment. As shown in FIG. 5, the system 500 includes a third-party provider 112, a processing server 102 with a blockchain network 104 in the form of a digital commerce platform (DCP) mainnet 105, and an external service, for example, a payment gateway 107. In accordance with an exemplary embodiment, the DCP mainnet 105 can include a micro-transaction node that has database(s) for storing the state of transactions (posted, paid, etc.) and storing the contracts, an event handler node, an issuer node, a timekeeper node, a routing node, and an audit network node. In accordance with an example, the third-party provider, for example, YouTube®, can connect with the DCP mainnet 105 via a contract API (application programming interface). The system 500 can use a contract template that can be defined by the third-party provider 112 and can be used to execute smart contracts as disclosed herein. When the template is installed, the address of the clauses is returned to the third-party provider 112, and wherein the third-party provider 112 uses this address.

In accordance with an exemplary embodiment, the contract API can be configured charger the customer (or user) 106 an amount per service, the amount being a micro-transaction as described herein. If the customer (or user) 106 total amount is zero (0), i.e., the customer is new to the platform or site, the system 500 will trigger a pre-authorization or authorization charge of a predetermined amount. In accordance with an embodiment, the predetermined amount can be an agreed to amount between the user 106 and the third-party provider 112. If after a certain period of time, the customer has not utilized the service, for example, the customer can be charged the amount of fees incurred for the services received, rather than continue to wait for the aggregated amount to cross a threshold.

Figure 6:
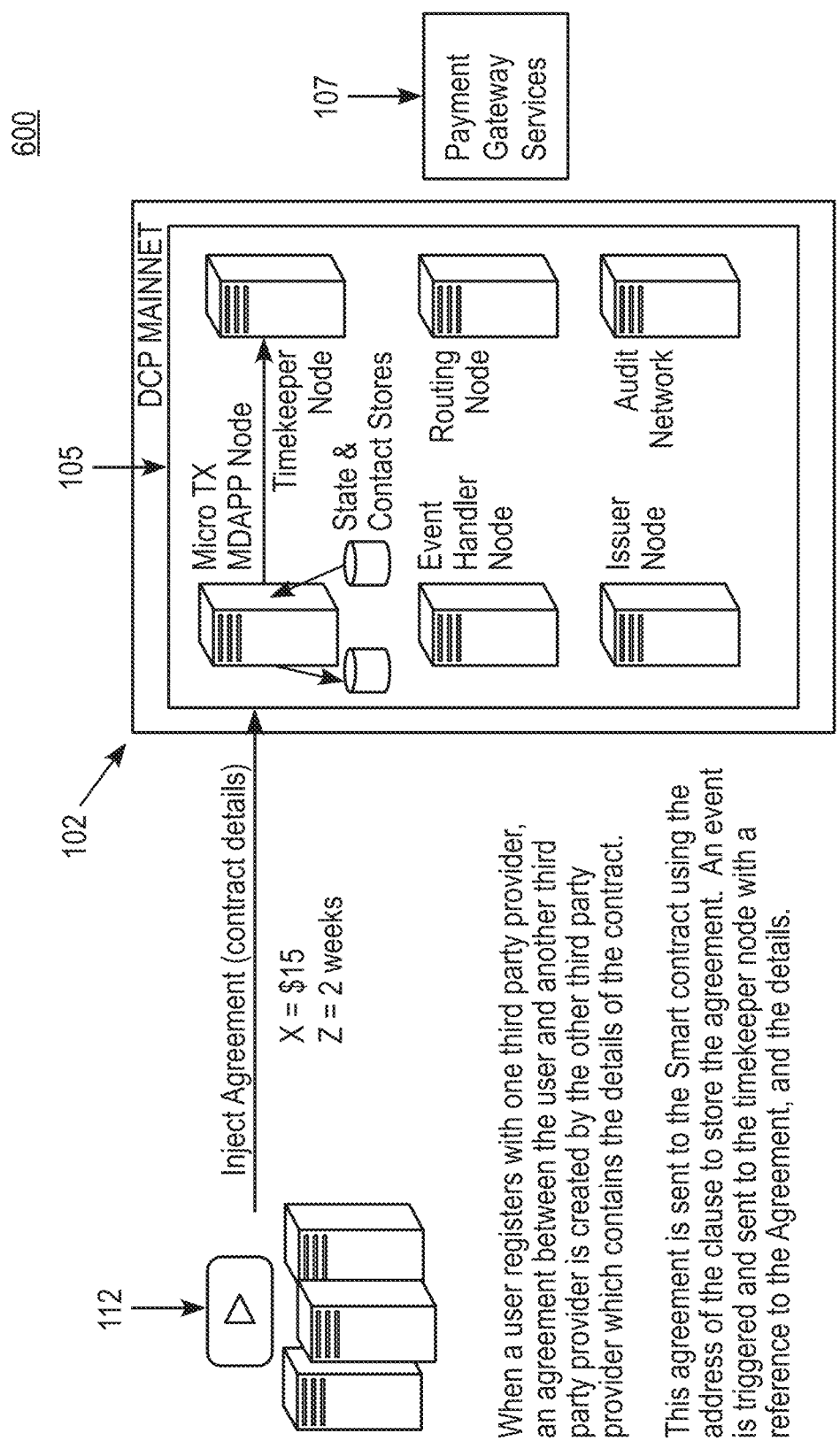
FIG. 6 is an illustration of a user onboarding the system for supporting micro-transactions in a digital asset network as shown in FIG. 5.

FIG. 6 is an illustration of a user onboarding the system 600 for supporting micro-transactions in a digital asset network as shown in FIG. 5. As shown in FIG. 6, when a customer (or user) 106 (not shown in FIG. 6) registers with one third-party provider 112, for example, YouTube®, an agreement between the customer (i.e., user) 106, and another third-party provider 112 (e.g., Google®), can be created by the other third party provider, which contains the details of the contract. In accordance with an exemplary embodiment, the agreement is sent to the smart contract using the address of the clause to store the agreement. In accordance with an exemplary embodiment, an event is triggered and sent to the timekeeper node with a reference to the agreement, and the details of the event.

Figure 7:
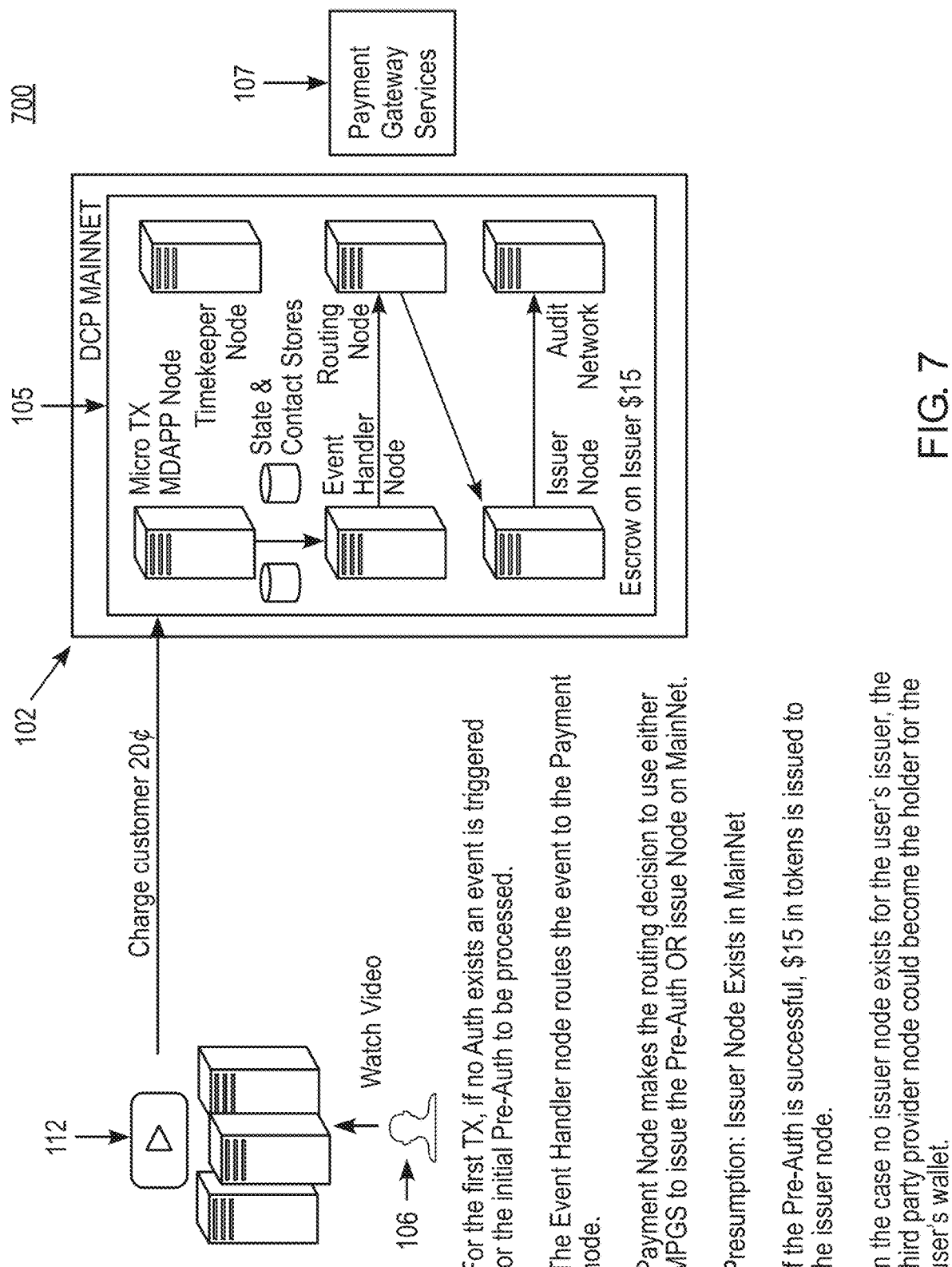
FIG. 7 is an illustration of a first transaction by the user of the system for supporting micro-transactions in a digital asset network as shown in FIG. 5.

FIG. 7 is an illustration of a first transaction 700 by the user of the system for supporting micro-transactions in a digital asset network as shown in FIG. 5. As shown in FIG. 7, for the first micro-transaction, if no authorization exists an event is triggered for the initial pre-authorization to be processed. The event handler node routes the event to the micro transaction MCAPP node that acts as a payment node. The payment node makes the routing decision to use either the processing server 102 or specifically the issuer node in the mainnet 105 to issue the preauthorization. In accordance with an embodiment, a presumption can be made that the issuer node exists in the mainnet 105. If the pre-authorization is successful, a certain amount of digital tokens is issued to the issuer node associated with an issuer 108 (not shown in FIG. 7). In the case no issuer node exists for the user's issuer 108, the third party provider 112, for example, could be used as the holder for the user's digital wallet.

Figure 8:
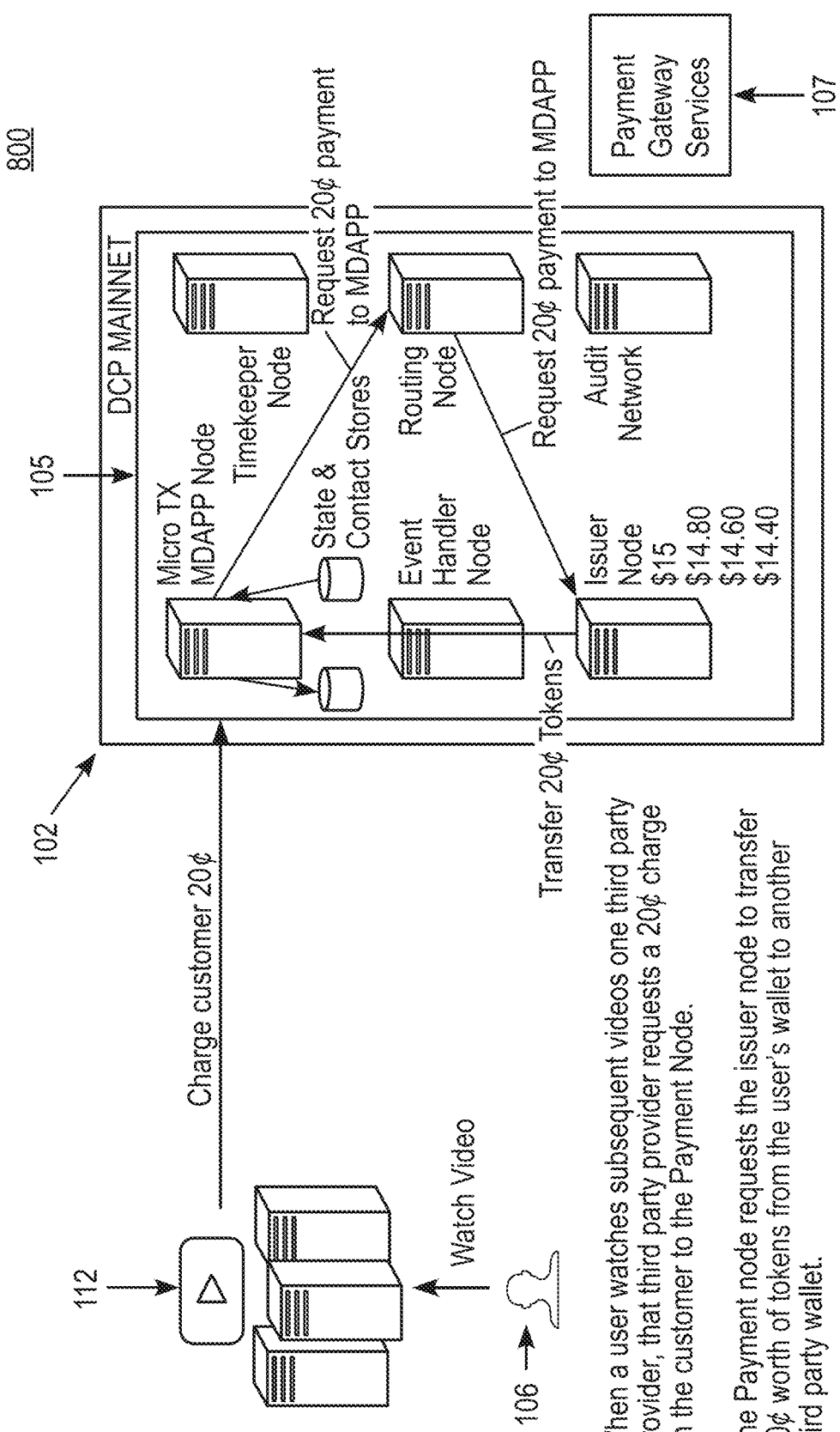
FIG. 8 is an illustration of a subsequent transaction by the user of the system for supporting micro-transactions in a digital asset network as shown in FIG. 5.

FIG. 8 is an illustration of a subsequent transaction 800 by the user of the system for supporting micro-transactions in a digital asset network as shown in FIG. 5. As shown in FIG.

8, when a user watches subsequent videos on the website or app or one third-party provider 112 (e.g., YouTube®), the third-party provider 112 requests a charge, for example, 20 cents, and the MDAPP payment node requests that the issuer node transfer 20 cents worth of tokens from the user's wallet to the wallet of another third party provider, e.g., Google® wallet.

Figure 9:
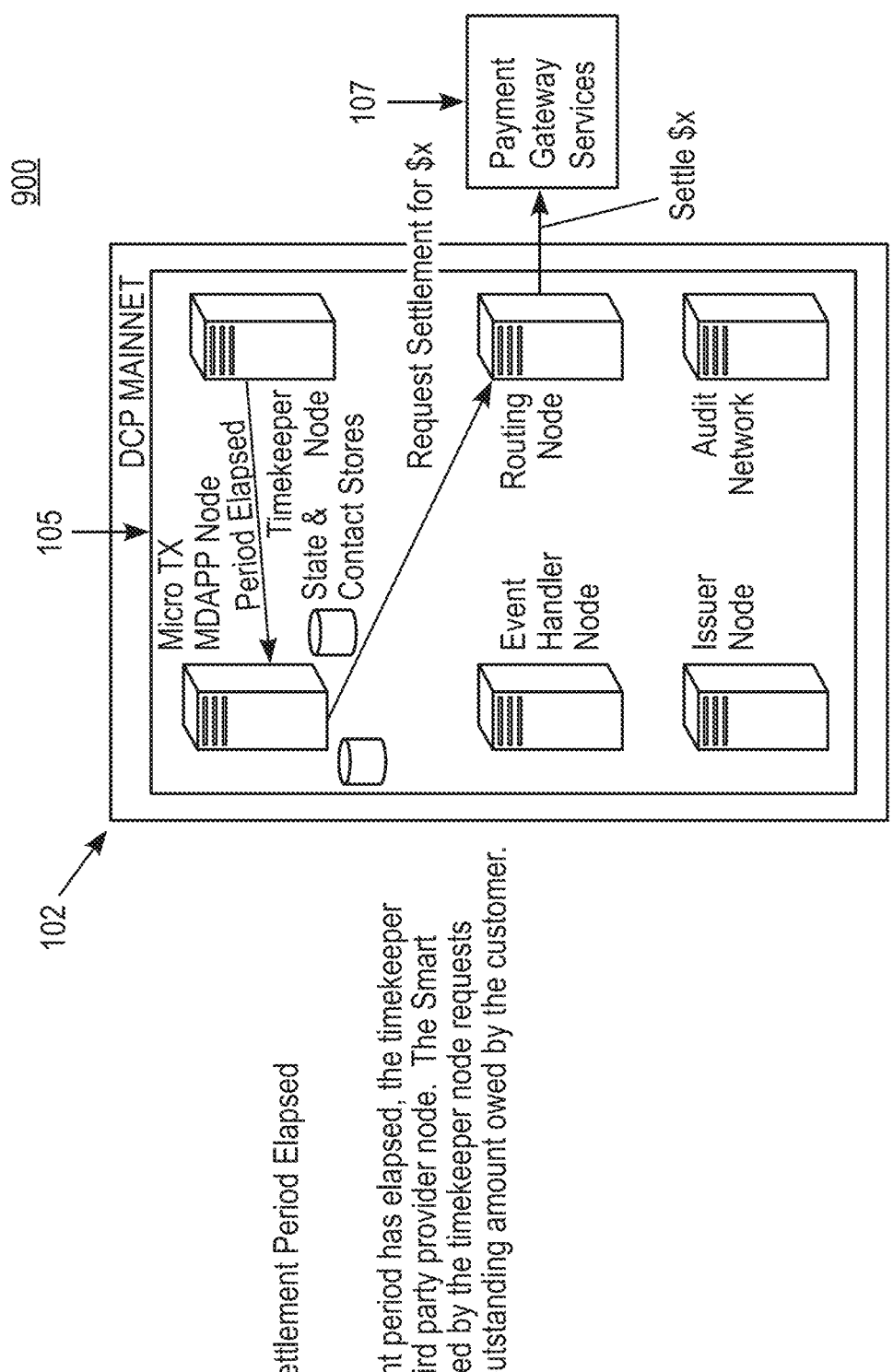
FIG. 9 is an illustration after a settlement period has elapsed of the system for supporting micro-transactions in a digital asset network as shown in FIG. 5.

FIG. 9 is an illustration of a settlement process 900 after a settlement period has elapsed of the system for supporting micro-transactions in a digital asset network as shown in FIG. 5. As shown in FIG. 9, when the settlement period has elapsed, the timekeeper node notifies the other third party provider that receives the payment (e.g., a Google® node that may have a wallet). The smart contract clause called by the timekeeper node requests settlement for the outstanding amount owed by the customer (i.e., user 106) of the micro transaction MCAPP node, which then sends a request for settlement to the routing node. The routing node then forwards the request to a payment gateway 107 to settle the payment in the normal course.

Computer System Architecture

Figure 10:
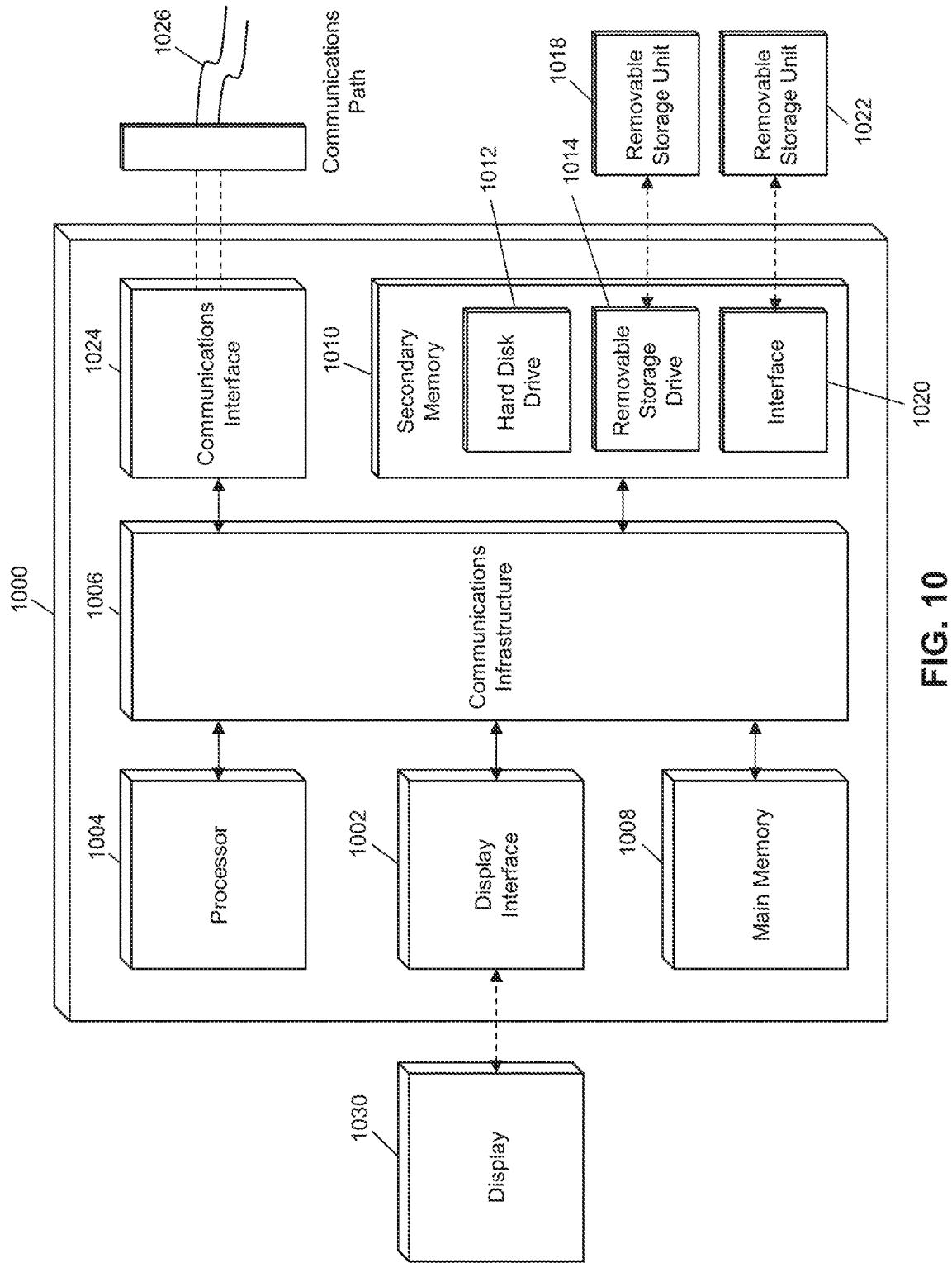
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 102 of FIG. 1 may be implemented in the computer system 1000 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the processes as shown in FIGS. 3-9.

If programmable logic is used, such logic may execute on a commercially available processing platform specifically configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012, etc.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general-purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 3-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods for providing a service node within a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of supporting micro-transactions in a digital asset network, the method comprising:
    forming, by a processing server, a digital commerce platform (DCP) mainnet including at least a micro-transaction node and an event handler node;
    connecting, by the DCP mainnet of the processing server, with a merchant, via a contract application programming interface (API), said API being configured to charge a consumer an amount per service, said amount being a micro-transaction;
    receiving, by a receiving device of the processing server, via the contract API and pursuant to an International Organization for Standardization's ISO 8583 standard, a transaction request for a micro-transaction initiated by the consumer with the merchant, the transaction request including at least information associated with the consumer, information associated with the merchant, and a transaction amount or projected transaction amount;
    forwarding, by a transmitting device of the processing server, the at least information associated with the consumer, the information associated with the merchant, and the transaction amount or projected transaction amount to an issuer for verification of funds;
    receiving, by the receiving device of the processing server, an authorization from the issuer for the transaction amount or projected transaction amount indicating that digital tokens are available for payment of the micro-transaction;
    forwarding, by the transmitting device of the processing server, the authorization to the merchant indicating that digital tokens are available for payment;
    receiving, by the receiving device of the processing server, a triggering event for the micro-transaction between the consumer and the merchant, said triggering event indicating that the consumer has begun using services provided by the merchant;
    in response to said triggering event, sending, by the transmitting device of the processing server, a request to the issuer for the available digital tokens;
    receiving, by the receiving device of the processing server, a plurality of digital tokens from the issuer for the payment of the micro-transaction between the consumer and the merchant;
    holding, by the processing server, the plurality of digital tokens received from the issuer for the micro-transaction in escrow with a time lock rather than forwarding the plurality of digital tokens to the merchant as the plurality of digital tokens is accrued, and
    upon expiration of said time lock, transferring, by the processing server, at least a portion of the plurality of digital tokens to the merchant for services provided to the consumer.

2. The method according to claim 1, wherein the processing server transfers the portion of the plurality of digital tokens held by the processing server to the merchant for services provided to the consumer in accordance with the micro-transaction on two or more occasions for settlement.

3. The method according to claim 1, comprising:
receiving, by the processing server, details of the services provided to the consumer in accordance with the micro-transaction;
deducting, by the processing, the portion of the plurality of digital tokens received from the issuer according to the details of the service provided to the consumer in accordance with the micro-transaction; and
holding the portion of the plurality of digital tokens for the merchant for settlement.

4. The method according to claim 1, comprising:
exchanging at least a portion of the plurality of digital tokens in a group or aggregate of digital tokens for a real currency over a payment rail.

5. The method according to claim 1, further comprising:
recording, in a blockchain network, each transaction of the micro-transaction.

6. The method according to claim 1, further comprising:
settling the micro-transaction between the consumer and the merchant after a settlement period.

7. The method according to claim 1, comprising:
setting a value of each of the plurality of digital tokens at a value less than a cost of processing the micro-transaction.

8. The method according to claim 1, comprising:
issuing the plurality of digital tokens from the issuer in accordance with smart contract capabilities of the merchant.

9. A system for supporting micro-transactions in a digital asset network, the system comprising:
a processing server;
an issuer; and
a merchant,
wherein the processing server is configured to:
form a digital commerce platform (DCP) mainnet including at least a micro-transaction node and an event handler node;
connect, via the DCP mainnet, with the merchant, via a contract application programming interface (API), said API being configured to charge a consumer an amount per service, said amount being a micro-transaction;
receive, via the contract API and pursuant to an International Organization for Standardization's ISO 8583 standard, a transaction request for a micro-transaction initiated by the consumer with the merchant, the transaction request including at least information associated with the consumer, information associated with the merchant, and a transaction amount or projected transaction amount;
forward the at least information associated with the consumer, the information associated with the merchant, and the transaction amount or projected transaction amount to an issuer for verification of funds;
receive an authorization from the issuer for the transaction amount or projected transaction amount indicating that digital tokens are available for payment of the micro-transaction;
forward the authorization to the merchant indicating that digital tokens are available for payment;
receive a triggering event for the micro-transaction between the consumer and the merchant, said triggering event indicating that the consumer has begun using services provided by the merchant;
in response to said triggering event, send a request to the issuer for the available digital tokens;
receive a plurality of digital tokens from the issuer for the payment of the micro-transaction between the consumer and the merchant;
hold the plurality of digital tokens received from the issuer for the micro-transaction in escrow with a time lock rather than forwarding the plurality of digital tokens to the merchant as the plurality of digital tokens is accrued, and
upon expiration of said time lock, transfer at least a portion of the plurality of digital tokens to the merchant for services provided to the consumer.

10. The system according to claim 9, wherein the processing server is configured to:
transfer the portion of the plurality of digital tokens held by the processing server to the merchant for services provided to the consumer in accordance with the micro-transaction on two or more occasions for settlement.

11. The system according to claim 9, wherein the processing server is configured to:
receive details of the services provided to the consumer in accordance with the micro-transaction;
deduct the portion of the plurality of digital tokens received from the issuer according to the details of the service provided to the consumer in accordance with the micro-transaction; and
hold the portion of the plurality of digital tokens for the merchant for settlement.

12. The system according to claim 9, wherein at least a portion of the plurality of digital tokens are exchanged in a group or aggregate of digital tokens for a real currency over a payment rail.

13. The system according to claim 9, wherein each transaction of the micro-transaction is recorded in a blockchain network.

14. The system according to claim 9, wherein the micro-transaction between the consumer and the merchant is settled after a settlement period.

15. The system according to claim 9, wherein a value of each of the plurality of digital tokens is set at a value less than a cost of processing the micro-transaction.

16. The system according to claim 9, wherein the plurality of digital tokens are issued in accordance with smart contract capabilities of the merchant.

* * * * *